United States Patent
Drake et al.

(10) Patent No.: US 10,974,132 B2
(45) Date of Patent: Apr. 13, 2021

(54) SYSTEMS AND METHODS TO PROVIDE A SHARED INTERACTIVE EXPERIENCE ACROSS MULTIPLE PRESENTATION DEVICES BASED ON DETECTION OF ONE OR MORE EXTRATERRESTRIAL BODIES

(71) Applicant: Disney Enterprises, Inc., Burbank, CA (US)

(72) Inventors: Corey Drake, Burbank, CA (US); Jonathan R. Hsu, Pomona, CA (US); Clifford Wong, Burbank, CA (US); Christopher Hunt, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 5 days.

(21) Appl. No.: 16/149,445

(22) Filed: Oct. 2, 2018

(65) Prior Publication Data
US 2020/0101372 A1    Apr. 2, 2020

(51) Int. Cl.
*A63F 13/217*     (2014.01)
*A63F 13/25*      (2014.01)
*G06T 11/60*      (2006.01)

(52) U.S. Cl.
CPC ............ *A63F 13/217* (2014.09); *A63F 13/25* (2014.09); *G06T 11/60* (2013.01); *A63F 2300/69* (2013.01)

(58) Field of Classification Search
CPC ......... A63F 13/217; A63F 13/25; G06T 11/60
See application file for complete search history.

(56) References Cited

U.S. PATENT DOCUMENTS

| | | | |
|---|---|---|---|
| 6,162,123 A | 12/2000 | Woolston | |
| 7,719,563 B2 | 5/2010 | Richards | |
| 9,972,138 B2 | 5/2018 | Goslin | |
| 10,223,836 B2 | 3/2019 | Goslin | |
| 10,300,372 B2 | 5/2019 | Goslin | |

(Continued)

FOREIGN PATENT DOCUMENTS

CN    109068161    12/2018

OTHER PUBLICATIONS

SkyView, SkyView_A Jam-Packed, Reality-Augmenting Key to the Sky _ Reviews _ TechNewsWorld_ 10242011.pdf, https://www.technewsworld.com/story/73564.html, published on Oct. 24, 2011 (Year: 2011).*

(Continued)

*Primary Examiner* — Yingchuan Zhang
(74) *Attorney, Agent, or Firm* — Esplin & Associates, PC

(57) ABSTRACT

This disclosure presents systems and methods to provide a shared augmented reality experience across multiple presentation devices based on detection of one or more extraterrestrial bodies. A presentation device may be configured to detect presence of an extraterrestrial body. The presentation device may obtain resource information corresponding to the extraterrestrial body. The resource information may specify information specific to the extraterrestrial body including a location of the extraterrestrial body. The presentation device may generate an image of a virtual object. The image may be presented so that the virtual object may be perceived as being present at the location of the extraterrestrial body. The virtual object may augment the appearance of the extraterrestrial body. Gameplay may be carried out utilizing the virtual object.

22 Claims, 4 Drawing Sheets

(56) References Cited

U.S. PATENT DOCUMENTS

| | | |
|---|---|---|
| 10,304,251 B2 | 5/2019 | Pahud |
| 10,481,680 B2 | 11/2019 | Panec |
| 10,546,431 B2 | 1/2020 | Hsu |
| 2002/0024675 A1 | 2/2002 | Foxlin |
| 2007/0126700 A1 | 6/2007 | Wright |
| 2007/0252815 A1 | 11/2007 | Kuo |
| 2010/0261526 A1 | 10/2010 | Anderson |
| 2011/0250962 A1 | 10/2011 | Feiner |
| 2012/0050535 A1 | 3/2012 | Densham |
| 2012/0262365 A1 | 10/2012 | Mallinson |
| 2012/0327117 A1 | 12/2012 | Weller |
| 2013/0042296 A1 | 2/2013 | Hastings |
| 2013/0044128 A1 | 2/2013 | Liu |
| 2013/0229396 A1 | 9/2013 | Huebner |
| 2013/0286004 A1 | 10/2013 | McCulloch |
| 2014/0002329 A1 | 1/2014 | Nishimaki |
| 2014/0003651 A1 | 1/2014 | Smoot |
| 2014/0078517 A1 | 3/2014 | Ben-Yishai |
| 2014/0080109 A1 | 3/2014 | Haseltine |
| 2014/0104169 A1 | 4/2014 | Masselli |
| 2014/0116469 A1 | 5/2014 | Kim |
| 2014/0160117 A1 | 6/2014 | Nehmadi |
| 2015/0035677 A1 | 2/2015 | Williams |
| 2015/0201188 A1 | 7/2015 | Pritch |
| 2015/0243286 A1 | 8/2015 | Goslin |
| 2015/0248785 A1 | 9/2015 | Holmquist |
| 2016/0055677 A1 | 2/2016 | Kuffner |
| 2016/0189411 A1 | 6/2016 | Matsunaga |
| 2016/0206957 A1 | 7/2016 | Goslin |
| 2016/0247324 A1 | 8/2016 | Mullins |
| 2016/0253842 A1 | 9/2016 | Shapira |
| 2016/0260261 A1 | 9/2016 | Hsu |
| 2016/0274662 A1 | 9/2016 | Rimon |
| 2016/0299563 A1 | 10/2016 | Stafford |
| 2016/0327798 A1 | 11/2016 | Xiao |
| 2017/0087465 A1 | 3/2017 | Lyons |
| 2017/0124713 A1 | 5/2017 | Jurgenson |
| 2017/0132841 A1 | 5/2017 | Morrison |
| 2017/0161561 A1 | 6/2017 | Marty |
| 2017/0203225 A1 | 7/2017 | Goslin |
| 2017/0213387 A1 | 7/2017 | Bean |
| 2017/0228936 A1 | 8/2017 | Goslin |
| 2017/0257594 A1 | 9/2017 | Goslin |
| 2017/0295229 A1 | 10/2017 | Shams |
| 2018/0081439 A1 | 3/2018 | Daniels |
| 2018/0173300 A1 | 6/2018 | Schwarz |
| 2018/0190017 A1 | 7/2018 | Mendez |
| 2018/0204362 A1 | 7/2018 | Tinsman |
| 2018/0239144 A1* | 8/2018 | Woods ................ A63F 13/212 |
| 2018/0295324 A1 | 10/2018 | Clark |
| 2018/0350056 A1 | 12/2018 | Cardenas Bernal |
| 2018/0350118 A1* | 12/2018 | Bastaldo-Tsampalis .................... G06T 19/006 |
| 2018/0365893 A1 | 12/2018 | Mullins |
| 2019/0019346 A1 | 1/2019 | Cuthbertson |
| 2019/0243446 A1 | 8/2019 | Panec |
| 2019/0304191 A1 | 10/2019 | Hsu |
| 2019/0329405 A1 | 10/2019 | Atohira |
| 2020/0037144 A1 | 1/2020 | Chen |
| 2020/0342683 A1 | 10/2020 | Panec |

OTHER PUBLICATIONS

Nbsp;SkyView, SkyView_ A Jam-Packed, Reality-Augmenting Key to the Sky _ Reviews _ TechNewsWorld_ 10242011.pdf, https://www.technewsworld.com/story/73564.html, published on Oct. 24, 2011 (Year: 2011).*

Dictionary.com, Defintion of lightsaber, 2019, Dictionary.com, pp. 1-2 (Year: 2019).

Virtual and Augmented Reality, Oct. 2016, Citi GPS: Global Perspectives & Solutions. (128 pages).

Hashimoto, Sunao, et al., "Touch Me: An Augmented Realtiy Based Remote Robot Manipulation", The 21st International Conference on Artificial Reality and Telexistence, Nov. 28-30, 2011, Osaka, Japan, The Virtual Relaity Society of Japan, pp. 61-66 (Year: 2011).

\* cited by examiner

SYSTEMS AND METHODS TO PROVIDE A SHARED INTERACTIVE EXPERIENCE ACROSS MULTIPLE PRESENTATION DEVICES BASED ON DETECTION OF ONE OR MORE EXTRATERRESTRIAL BODIES

FIELD

This disclosure relates to systems and methods to provide a shared interactive experience across multiple presentation devices based on detection of one or more extraterrestrial bodies.

BACKGROUND

Devices and systems are available to provide virtual reality (VR) and/or augmented reality (AR) experiences. In particular, handheld and/or wearable technology may be used. Wearable technology may include head-mounted displays (HMD). Handheld technology may include mobile computing platforms, such as smart phones and/or tablets.

Stargazing applications allow a user to point their mobile phone's camera at the sky and obtain information about the stars, planets, and/or other celestial bodies present in the night's sky. Some applications may provide overlays that highlight the celestial bodies currently being viewed. For example, a user may point their mobile phone's camera at the Big Dipper, and an application may provide an overlay of lines connecting the stars that form it.

SUMMARY

One aspect of the disclosure relates to a system configured to provide a shared interactive experience across multiple presentation devices based on detection of one or more extraterrestrial bodies. An extraterrestrial body may refer to an entity located off of the Earth's surface. An extraterrestrial body may be an entity present within the Earth's atmosphere and/or outside of the Earth's atmosphere. An extraterrestrial body may be a naturally occurring entity and/or an man-made entity. By way of non-limiting illustration, an extraterrestrial body may include one or more of a moon, a planet, a star, a satellite, a space station, a comet, an airplane, a meteor, a rocket, and/or other bodies.

An interactive experience may take place in an interactive environment. An interactive environment may include one or more of a virtual reality environment, an augmented reality environment, and/or other interactive environment. An augmented reality environment may include views of images of virtual content within a virtual environment superimposed over views of a real-world environment. In some implementations, a user may actively view the real-world environment, for example, through a visor. In some implementations, a user may passively view the real-world environment, for example, through a display that presents images of the real-world environment. A virtual reality environment may include views of images of virtual content within a virtual environment. Virtual content may include one or more virtual objects and/or other virtual content. The terms "space" and "environment" in the context of virtual reality and/or augmented reality may be used interchangeably herein.

In SLAM (simultaneous localization and mapping) applications utilized in augmented reality and virtual reality systems, a device constructs its own interpretation of a geometry of a physical environment (referred to herein as a "map" or "environment record") by comparing images from a camera as the user moves the device around the environment. Even with identical devices in the same environment, the devices may not generate the exact same map of the physical environment, due to the randomness of the camera movement. Because of this, it may be difficult for multiple devices to share the same interactive experience, making large scale and/or in-person multiplayer interactive experiences unfeasible. Large scale may refer to gameplay where users may be spread out over many locations. One or more implementations of the system presented herein propose a solution to these and/or other problems by utilizing one or more extraterrestrial bodies. For example, an extraterrestrial body may be detected by one or more user devices and information about that extraterrestrial body may be obtained. The information about the extraterrestrial body may include location of the extraterrestrial body. The user devices may use the location of the extraterrestrial body as a common reference point to define a virtual environment. In some implementations, a virtual object may be placed over the extraterrestrial body and used as part of gameplay. Once the location and/or other information about the extraterrestrial body is established, networking between devices can be used to place other virtual objects in the virtual environment, with their locations consistent between the virtual environments of the users. Further, users may be greatly spread out, for example, even on different sides of the world.

The system configured to provide a shared augmented reality experience across multiple presentation devices may include one or more presentation devices and/or other components.

A presentation device may be configured to generate images of a virtual environment including virtual content and present the images such that the virtual environment including the virtual content may be perceived by the user as being located in a real-world environment.

The presentation device may include and/or may be coupled to non-transitory electronic storage. The non-transitory electronic storage may be configured to store one or more of virtual content information, environment record information, and/or other information. The virtual content information may define a virtual environment including virtual content. The virtual content may include one or more virtual objects. The environment record information may define a composition of a real-world environment. The composition of the real-world environment may include one or more reference points. The virtual environment may be specified with respect to the one or more reference points within the real-world environment.

The presentation device may include and/or may be coupled to one or more physical processors. The one or more physical processors may be configured by machine-readable instructions. Executing the machine-readable instructions may cause the one or more physical processors to facilitate providing a shared interactive experience across multiple presentation devices. The machine-readable instructions may include one or more computer program components. The one or more computer program components may include one or more of a detection component, a content component, a map component, a game component, a control component, an input component, and/or other components.

The detection component may be configured to detect presence of one or more extraterrestrial bodies.

The content component may be configured to obtain resource information corresponding to an individual extraterrestrial body. The resource information may specify information specific to the extraterrestrial body. The resource information may include one or more of location information, trajectory information, phase information, and/or other information. The location information may include location of the extraterrestrial body. The trajectory information may specify a path of movement of the extraterrestrial body. The phase information may specify a visibility of the extraterrestrial body.

The map component may be configured to specify, within the environment record information, the location of the extraterrestrial body as a first reference point within the real-world environment. The virtual environment including virtual content may be specified with respect to the location of the extraterrestrial body.

The control component may be configured to control the presentation device to generate an image of a virtual object. The image may be presented so that the virtual object may be perceived as being present at the location of the extraterrestrial body such that the virtual object augments the appearance of the extraterrestrial body.

The control component may be configured to control the presentation device to effectuate gameplay within the virtual environment. In some implementations, effectuating the gameplay within the virtual environment may include facilitating user interactions with the virtual object.

The input component may be configured to obtain user input to perform one or more game actions within the virtual environment. The control component may be configured to control the presentation device to effectuate the user input to perform the one or more game actions within the virtual environment. In some implementations, effectuating the user input may cause the user interactions with the virtual object and/or other virtual objects.

The game component may be configured to obtain game state information. The game state information may define a part of the gameplay within the virtual environment effectuated by other presentation devices associated with other users. The part of the gameplay within the virtual environment effectuated by the other presentation devices associated with the other users may include one or more other virtual objects being controlled and/or affected by the other users.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
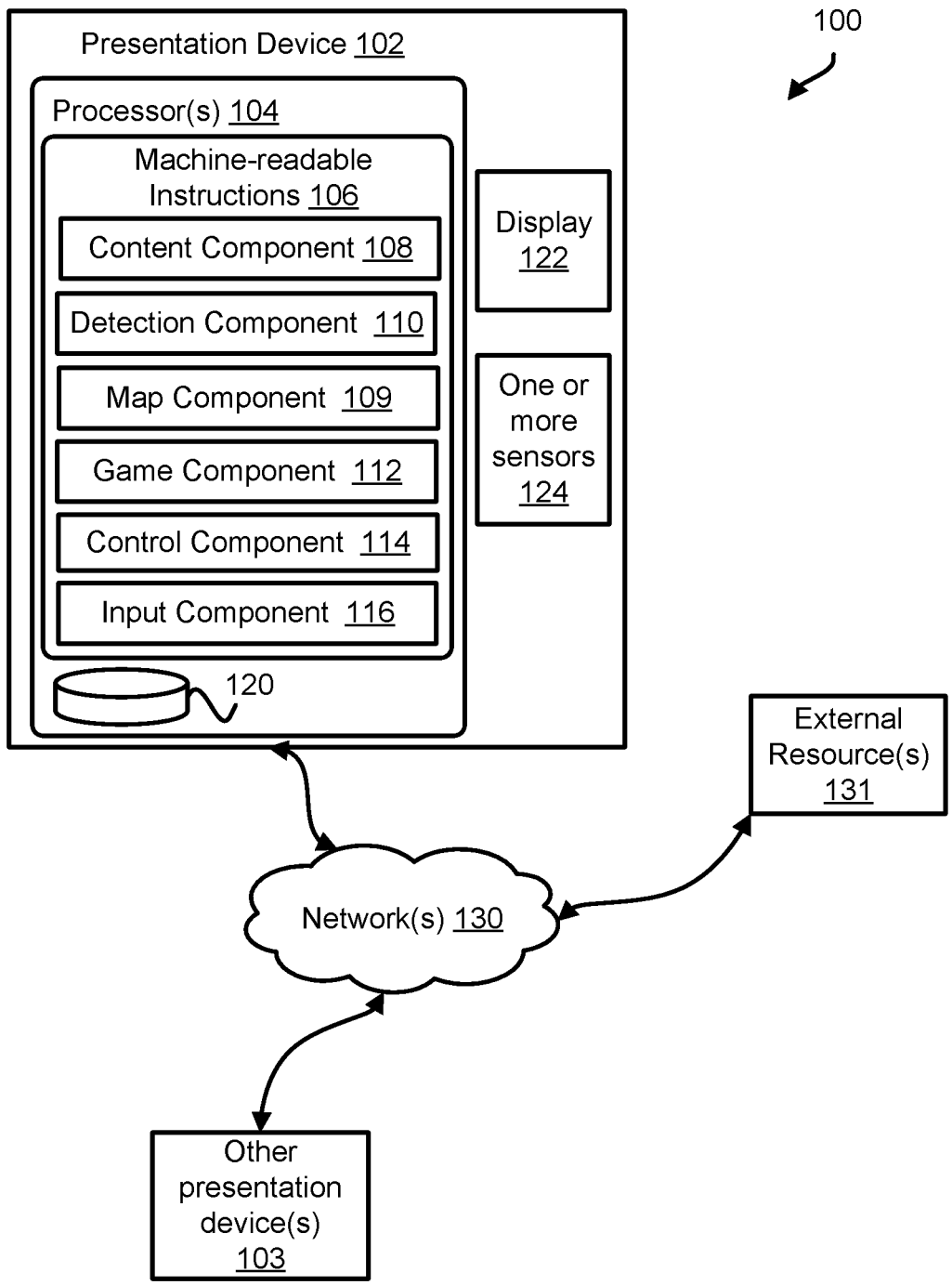
FIG. 1 illustrates a system configured to provide a shared interactive experience across multiple presentation devices, in accordance with one or more implementations.

FIG. 1 illustrates a system 100 configured to provide a shared interactive experience across multiple presentation devices based on detection of one or more extraterrestrial bodies, in accordance with one or more implementations. An extraterrestrial body may refer to an entity located off of the Earth's surface. An extraterrestrial body may be an entity present within the Earth's atmosphere and/or outside of the Earth's atmosphere. An extraterrestrial body may be a naturally occurring entity and/or an man-made entity. By way of non-limiting illustration, an extraterrestrial body may include one or more of a moon, a planet, a star, a satellite, a space station, a comet, an airplane, a rocket, and/or other bodies.

An interactive experience may include one or more of playing a game, interacting with virtual content, interacting with real-world object, interacting with other users, and/or other experiences. In some implementations, a game may provide gameplay of one or more gameplay types. A gameplay type may include one or more of cooperative gameplay, solo gameplay, combative gameplay, team-based gameplay, racing, resource collection, scavenger hunt, and/or other types of gameplay. In some implementations, a game taking place in a virtual environment may be in the form of a massively multiplayer online role-playing game (MMORPG).

An interactive experience may take place in an interactive space. An interactive space may include one or more of an augmented reality (AR) environment, a virtual reality (VR) environment, and/or other interactive spaces. An augmented reality environment may include views of images of virtual content within a virtual environment superimposed over views of a real-world environment. In some implementations, a user may actively view the real-world environment, for example, through a visor. In some implementations, a user may passively view the real-world environment, for example, through a display that presents images of the real-world environment. A virtual reality environment may include views of images of virtual content within a virtual environment. Virtual content may include one or more virtual objects and/or other virtual content. The terms "space" and "environment" in the context of virtual reality and/or augmented reality may be used interchangeably herein.

The system 100 may include one or more of a presentation device 102, one or more other presentation devices 103, one or more external resources 131, and/or other components. While some descriptions herein may be directed to features and/or functions of presentation device 102, it is to be noted that other ones of one or more other presentation devices 103 may be configured similarly as presentation device 102.

The presentation device 102 may include one or more of one or more physical processors 104, non-transitory electronic storage 120, a display 122, one or more sensors 124, and/or other components.

One or more physical processors 104 may be configured to provide information-processing capabilities in presentation device 102. As such, in some implementations, processor(s) 104 may include one or more of a digital processor, an analog processor, a digital circuit designed to process information, an analog circuit designed to process information, a state machine, and/or other mechanisms for electronically processing information.

In some implementations, one or more physical processors 104 may be configured to provide remote hosting of features and/or functions of machine-readable instructions 106 to presentation device 102. In some implementations, one or more physical processors 104 may be remotely located from presentation device 102. The one or more physical processors 104 may communicate with presentation device 102, via client/server architecture, and/or other communication schemes. By way of non-limiting illustration, one or more physical processors 104 may comprise one or more servers and/or one or more computing platforms.

In some implementations, one or more physical processors 104 may be configured to provide local hosting of features and/or functions of machine-readable instructions 106 to presentation device 102. In some implementations, one or more physical processors 104 may be included with and/or coupled to presentation device 102. The one or more physical processors 104 may communicate with presentation device 102 via local wired and/or wireless connections (e.g., USB, BLE and/or other connections), and/or other communication schemes.

In some implementations, one or more physical processors 104 may be removably coupled to presentation device 102. By way of non-limiting illustration, one or more physical processors 104 may be included in a mobile computing platform (not shown in FIG. 1). The mobile computing platform may include one or more of a cellular telephone, a smartphone, a laptop, a tablet computer, an AR/VR platform, and/or other computing platform. The mobile computing platform may be removably attachable to presentation device 102.

In some implementations, presentation device 102 may itself comprise a mobile computing platform. The mobile computing platform may include one or more of a cellular telephone, a smartphone, a laptop, a tablet computer, and/or other computing platform. Such an implementation may provide an augmented reality environment with passive views of the real world.

The display 122 may be configured to present virtual content, views of the real world, and/or other content. Virtual content may be in the form of images, video, text, and/or other content. Views of the real-world may be in the form of images and/or video. Presentation of content via display 122 of presentation device 102 may be facilitated by control signals communicated to display 122 (see, e.g., control component 114). The display 122 may include one or more of a screen, a set of screens, a touchscreen, a monitor, and/or other displays.

In some implementations, display 122 may be configured to present virtual content individually to each eye of a user as stereoscopic pairs. In some implementations, presentation device 102 may comprise, for example, a headset (not shown in FIG. 1). When presentation device 102 is installed on a user's head, the user's gaze may be directed towards presentation device 102 (or at least display 122) to view content presented by and/or on display 122.

In some implementations, display 122 may include one or more of a transparent, semi-transparent, reflective, and/or semi-reflective display component. Images of virtual content may be presented on display 122 such that the user may view the images presented on display 122 as well as the real-world through display 122. The virtual content may be perceived as being present in the real world. Such a configuration may provide an interactive space comprising an augmented reality environment with an active view of the real world.

In some implementations, display 122 may comprise a display screen configured to present virtual content. The user may view the display screen such that the display screen may encompass, substantially or entirely, the users vision without providing views of the real-world through the display screen. Such a configuration may provide an interactive space comprising a virtual reality environment.

Individual sensors of one or more sensors 124 may be configured to generate output signals. In some implementations, an individual sensor may include one or more of an orientation sensor, a depth sensor, an image sensor, a location sensor, and/or other sensors.

An orientation sensor may be configured to generate output signals conveying orientation information and/or other information. Orientation information derived from output signals of an orientation sensor may define an orientation of presentation device 102. In some implementations, orientation of presentation device 102 may refer to one or more of a pitch angle, a roll angle, a yaw angle, a heading, a pointing direction, a bearing, and/or other measurements. An orientation sensor may include an inertial measurement unit (IMU) and/or other devices. An orientation sensor may include one or more of an accelerometer, a gyroscope, a magnetometer, Inclinometers, and/or other devices. In some implementations, orientation may be acquired by machine vision (e.g., photogrammetry techniques).

In some implementations, an image sensor may be configured to generate output signals conveying image information. Image information may define images of the real world. Image information may specify visual content within a field of view of the image sensor. The visual content may include real-world objects and/or surfaces present in the real world. The image information may specify visual content in the form of pixels in an image. Pixels may be defined by one or more of location (e.g., two-dimensional coordinates), color, transparency, and/or other information. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors.

The images of the real world may be used to detect presence of one or more extraterrestrial bodies, objects and/or surfaces present in the real world, terrestrial objects, users, and/or other entities. Detection of presence may be performed using one or more image-processing techniques and/or other techniques. One or more image processing techniques may include one or more of bundle adjustment, speeded up robust features (SURF), scale-invariant feature transform (SIFT), computer vision, and/or other techniques.

In some implementations, a depth sensor may be configured to generate output signals conveying depth information and/or other information. Depth information may include distance and/or range of real-world surfaces and/or objects from the depth sensor, and/or other information. In some implementations, depth information may be provided in the form of a point cloud. A point cloud may include a set of points. Individual points may represent individual surfaces within the real world. The depth information may specify, for individual points, one or more of an individual distance of the point from the depth sensor, an individual orientation of the point with respect to the depth sensor, and/or other information. In some implementations, a depth sensor may comprise one or more of a time-of-flight sensor, a structured light sensor, an unstructured light sensor, an active stereo pair, a passive stereo pair, and/or other depth sensing devices.

In some implementations, a location sensor may be configured to generate output signals conveying location information and/or other information. Location information may include real-world location of the location sensor within the real-world environment. In some implementations, a location sensor may comprise a global position system (GPS), and/or other location sensing devices.

The non-transitory electronic storage 120 may be configured to store one or more of virtual content information, environment record information, and/or other information. The environment record information may include one or more environment records. A environment record may include information describing aspects of a real-world environment. In general, information describing aspects of a real-world environment may provide an understanding of a composition of the real-world environment, referred to as a "location composition." The location composition of a real-world environment may define one or more of physical dimensions of the environment, objects and/or surfaces present in and/or moving through the environment, and/or other information related to the composition of the environment. In some implementations, a location composition may include one or more reference points and/or other information. A reference point may be related to a visually salient 3D feature point and/or object present in the environment. A reference point may be specified by one or more of a 3D position of a point and/or object, a 2D position of a point and/or object as seen in one or more images, a descriptor including a uniquely, or nearly-uniquely identifying description of an appearance of the immediate surroundings a point and/or object, a timestamp of when the reference point was created, a quantifier of an uncertainty regarding the 3D position, and/or other information.

The virtual content information may define a virtual environment including virtual content. The virtual content may include one or more virtual objects. The virtual environment may be specified with respect to the one or more reference points included in a location composition of an environment record. The one or more reference points included in a location composition of an environment record may provide points of reference for specifying a virtual environment and/or specifying where virtual objects may be placed. In some implementations, a reference point may act as a point of origin for a coordinate system of the virtual environment and/or location composition.

The one or more physical processors 104 may be configured by machine-readable instructions 106. Executing machine-readable instructions 106 may cause one or more physical processors 104 to facilitate providing a shared augmented reality experience across multiple presentation devices based on detection of one or more extraterrestrial bodies. The machine-readable instructions 106 may include one or more computer program components. The one or more computer program components may include one or more of a content component 108, a detection component 110, a map component 109, a game component 112, a control component 114, an input component 116, and/or other components.

The content component 108 may be configured to obtain one or more of virtual content information, environment record information, resource information, and/or other information. The content component 108 may obtain information from one or more of electronic storage 120, external resource(s) 131, and/or other storage locations.

Resource information may be specific to individual extraterrestrial bodies. The resource information may include one or more of location information, trajectory information, phase information, and/or other information.

The location information may include location of an extraterrestrial body and/or other information. In some implementations, location may be specified with respect to one or more of a terrestrial reference point, an astrological measure of location, and/or other techniques for specifying location of extraterrestrial bodies.

The trajectory information may specify a path of movement of an extraterrestrial body and/or other information. The path of movement of an extraterrestrial body may be specified with respect to one or more of a terrestrial reference point, an astrological measure of location and/or movement, and/or other techniques for specifying location and/or movement of extraterrestrial bodies. In some implementations, the trajectory information for an extraterrestrial body may be calculated using equations of motions. For example, classical mechanics can be used to predict and/or determine the location of the extraterrestrial body over time. In some implementations, the trajectory information for an extraterrestrial body may be derived from ephemeris data.

The phase information may specify a visibility of an extraterrestrial body. The visibility may refer to what part or parts of an extraterrestrial body may be viewable from Earth. In some implementations, the visibility may be dependent on one or more of a location of the extraterrestrial body relative a user, a direction of travel (e.g., trajectory) of the extraterrestrial body, a natural phase cycle of the extraterrestrial body, and/or other information. By way of non-limiting illustration, if the extraterrestrial body is the Moon, the visibility may specify the phase of the Moon and/or what parts of the Moon may be visible to an observer at a given location and/or orientation on Earth. By way of non-limiting illustration, if the extraterrestrial body is an airplane, the visibility may specify whether the front, rear, and/or side of the airplane is visible to an observer at a given location and/or orientation on Earth and/or based on a trajectory of the airplane. It is noted that the above examples of the Moon and an airplane are provided for illustrative purposes only and is not to be considered limiting. Instead, it is to be understood that phase information may specify visibility of an extraterrestrial body in other ways.

In some implementations, visibility may be determined from the perspective of presentation device 102. By way of non-limiting illustration, content component 108 may be configured to obtain output signals from one or more sensors 124. The output signals may convey one or more of orientation information, location information, and/or other information. The visibility of an extraterrestrial body may be dependent on the location and/or orientation of the presentation device 102 and one or more of a location of the extraterrestrial body, a direction of travel (e.g., trajectory) of the extraterrestrial body, a natural phase cycle of the extraterrestrial body, and/or other information.

In some implementations, resource information may be obtained from external resource(s) 131 specific to particular extraterrestrial bodies. By way of non-limiting illustration, an extraterrestrial body may include the Moon. The resource information for the Moon may be a resource (e.g., a website and/or database) where information about the Moon and/or the Moon's cycle may be (publicly and/or privately) available. By way of non-limiting illustration, an extraterrestrial body may include the International Space Station (ISS). The resource information for the ISS may be a resource (e.g., a website and/or database) where information about the ISS may be (publicly and/or privately) available. By way of non-limiting illustration, an extraterrestrial body may include an airplane. The resource information for the airplane may be an resource provided by an airline (e.g., a website and/or database) where information about the airplane may be (publicly and/or privately) available. It is noted that the above examples of the Moon, the ISS, and an airplane are provided for illustrative purposes only and is not to be considered limiting. Instead, it is to be understood that resource information for other extraterrestrial bodies may be obtained from other external resource(s) specific to the particular extraterrestrial bodies.

The detection component 110 may be configured to detect presence of one or more extraterrestrial bodies. The detection component 110 may be configured to detect presence of one or more extraterrestrial bodies based on output signals from one or more sensors included in one or more sensors 124.

In some implementations, detection component 110 may detect the presence of individual extraterrestrial bodies within a field of view of an image sensor included in one or more sensors 124. Detection component 110 may obtain the output signals generated by the image sensor. Detection component 110 may detect the presence of individual extraterrestrial bodies based on image information conveyed by the output signals, and/or other information. The image information may define visual content in the form of images depicting the individual extraterrestrial bodies, and/or other content. In some implementations, detection component 110 may utilize one or more image processing techniques to detect presence of the individual extraterrestrial bodies. One or more image processing techniques may include one or more of bundle adjustment, speeded up robust features (SURF), scale-invariant feature transform (SIFT), computer vision, and/or other techniques.

In some implementations, detection component 110 may detect the presence of individual extraterrestrial bodies based on one or more of location of presentation device 102, orientation of presentation device 102, resource information, and/or other information. Detection component 110 may obtain the output signals generated by one or more of an orientation sensor, a location sensor, and/or other sensors. Detection component 110 may detect the presence of individual extraterrestrial bodies based on a location of the presentation device 102 (conveyed by output signals of a location sensor), an orientation of the presentation device 102 (conveyed by output signals of an orientation sensor), and/or a location of an extraterrestrial body (conveyed by resource information). By way of non-limiting illustration, a user may aim and/or point presentation device 102 into the sky. Based on one the location and/or orientation of presentation device 102 (e.g., its pointing direction) and a location and/or orientation of an extraterrestrial body, detection component 110 may be configured to determine that the presentation device 102 may be currently pointing at a given extraterrestrial body insofar that the given extraterrestrial body may be detected. Detection via one or more of location of presentation device 102, orientation of presentation device 102, and/or resource information may be performed whether or not an extraterrestrial body may actually be visible to an observer.

The map component 109 may be configured to determine environment record information and/or other information. The map component 109 may be configured to determine environment record information from information conveyed by output signals of one or more sensors 124, and/or other information. Techniques to determine environment record information may include one or more of simultaneous localization and mapping (SLAM), parallel tracking and mapping (PTAM), particle filter localization, image registration, stereophotogrammetry, Speeded Up Robust Features (SURF), Scale-Invariant Feature Transform (SIFT), Oriented FAST (Features from Accelerated Segment Test) and rotated BRIEF (Binary Robust Independent Elementary Features) (ORB), Binary Robust Invariant Scalable Keypoints (BRISK), and/or other techniques. These techniques may utilize, as input, output signals from individual sensors of one or more sensors 124 including one or more of an image sensor, a depth sensor, an orientation sensor, a location sensor, and/or other sensors and/or other information.

In some implementations, map component 109 may be configured to specify, within the environment record information, a location of an extraterrestrial body as a reference point within a location composition of a real-world environment. By doing so, a virtual environment presented by presentation device 102 may be specified with respect to the location of the extraterrestrial body and/or a virtual object may be overlaid over views of the extraterrestrial body to augment the appearance of the extraterrestrial body. The image of a virtual object may be presented so that the virtual object appears at the location of the extraterrestrial body. Individual ones of one or more other presentation devices 103 may similarly specify, within environment record information stored thereon, the location of the same extraterrestrial body as a reference point within a location composition of the real-world environment. Thus, the extraterrestrial body may provide a technique in which environment records may be synchronized across multiple presentation devices to facilitate a multiplayer interactive experience.

The control component 114 may be configured to control presentation device 102 (e.g., via display 122) to generate and present images of a virtual environment including virtual content. By way of non-limiting illustration, control component 114 may be configured to control presentation device 102 to generate an image of a virtual object. The image may be generated so that the virtual object may be perceived as being present at the location of an extraterrestrial body such that the virtual object may augment the appearance of the extraterrestrial body. In some implementations, the virtual object may visually occlude some or all of the extraterrestrial body.

In some implementations, the control component 114 may be configured to control the presentation device 102 to effectuate gameplay within the virtual environment being perceived by a user as being located in the real-world environment. In some implementations, effectuating the gameplay within the virtual environment may include facilitating user interactions with the virtual object. By way of non-limiting illustration, the virtual object augmenting the appearance of the extraterrestrial body may be a game entity. The user may interact with presentation device 102 (see, e.g., input component 116 described herein) to provide one or more game actions including interactions with the game entity. By way of non-limiting illustration, a user may battle the game entity. In some implementations, gameplay may include interactions with virtual object controlled by other users. The control component 114 may be configured to generate one or more images of one or more other virtual objects being controlled by one or more other users so that the one or more other virtual objects may be perceived as being present in the real-world environment.

In some implementations, effectuating gameplay may be facilitated by information obtained and/or generated by game component 112.

The game component 112 may be configured to implement one or more instances of a virtual environment and/or game taking place in the virtual environment executed by machine-readable instructions 106 to determine views of the virtual environment and/or game. In some implementations, the virtual environment and/or game may be hosted by external resource(s) 131 (e.g., a game server). The views may be communicated (e.g., via streaming, via object/position data, and/or other information) from external resource(s) 131 to presentation device 102. The view determined and presented to a given user may correspond to a game entity being controlled by the given user. The view determined and presented to the given user may correspond to a location in the virtual environment (e.g., the location from which the view is taken, the location the view depicts, and/or other locations) and/or real-world environment, a zoom ratio, a dimensionality of objects, a point-of-view, and/or view parameters. One or more of the view parameters may be selectable by the user.

The instance of the virtual environment and/or game may comprise a simulated space that may be accessible by one or more users via presentation devices that present the views of the virtual environment and/or game to the one or more users. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by machine-readable instructions 106 may be synchronous, asynchronous, and/or semi-synchronous.

The above description of the manner in which views of the virtual environment and/or game are determined by game component 112 is not intended to be limiting. The game component 112 may be configured to express the virtual environment and/or game in a more limited, or richer, manner. For example, views determined for the virtual environment and/or game may be selected from a limited set of graphics depicting an event in a given place within the virtual environment and/or game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual environment and/or game are contemplated.

Within the instance(s) of the virtual environment and/or game executed by game component 112, users may control game entities, objects, simulated physical phenomena (e.g., wind, rain, earthquakes, and/or other phenomena), and/or other elements within the virtual environment and/or game to interact with the virtual environment, game, and/or other users. One or more user controlled element(s) may move through and interact with the virtual environment and/or game (e.g., non-user characters and/or other objects). Individual users may have an "inventory" of virtual items and/or currency that the user can use (e.g., by manipulation of a game entity or other user controlled element, and/or other items) within the virtual environment and/or game.

Virtual items may include one or more of a virtual weapon, a tool, a food, a currency, a reward, a bonus, health, a portion, an enhancement, a mount, a power-up, a speed-up, clothing, a vehicle, an anatomical feature of a game entity, a troop or troop type, a pet, a virtual resource, and/or other virtual items and/or goods.

The users may participate in the instance of the virtual environment and/or game by controlling one or more of the available user controlled elements in the virtual environment and/or game. Control may be exercised through control inputs and/or commands input by the users through presentation device 102 (see, e.g., input component 116 described herein). The users may interact with each other through communications exchanged within the virtual environment and/or game. Such communications may include one or more of textual chat, instant messages, private messages, voice communications, and/or other communications. Communications may be received and entered by the users via their respective presentation devices. Communications may be routed to and from the appropriate users through external resource(s) 131.

User participation in the virtual space may include controlling game entities in the virtual space. A game entity may refer to a virtual object (or group of objects) present in the virtual space that represents an individual user. For example, a game entity may be a virtual character (e.g., an avatar) and/or other virtual objects. A group of game entities may include a group of virtual characters, virtual objects, and/or other content.

In some implementations, an instance of the virtual environment and/or game may be persistent. That is, the virtual environment and/or game may continue on whether or not individual users are currently logged in and/or participating in the virtual environment and/or game. A user that logs out of the virtual environment and/or game and then logs back in some time later may find the virtual environment and/or game has been changed through the interactions of other users with the virtual environment and/or game during the time the player was logged out. These changes may include changes to the simulated physical space, changes in the user's inventory, changes in other user's inventories, changes experienced by non-player characters, changes to the virtual items available for use in the virtual environment and/or game, and/or other changes.

In some implementations, game component 112 may be configured to generate and/or obtain game state information. The game state information may define state of an instance of the virtual environment and/or game over time. The state may include one or more of locations of virtual object, status of virtual objects, status of an inventory of goods, and/or other information defining state of the instance of the virtual environment and/or game. Status of virtual objects may include game attributes of game entities. By way of non-limiting illustration, a game entity may be an opponent in a battle. An attribute of the game entity may be a health attribute and/or other attribute. A value of the health attribute and/or other attribute may be stored as part of the status of the game entity.

The game state information may be obtained by multiple users such that gameplay may be synchronous and persistent between the multiple users.

In some implementations, game component 112 may be configured to obtain game state information defining part of gameplay within the virtual environment effectuated by other presentation devices associated with other users. The part of the gameplay within the virtual environment effectuated by the other presentation devices associated with the other users may include one or more other virtual objects being controlled by the other users.

In some implementations, the virtual environment and/or game may be synchronous between users who may be physically present at the same or similar location. In some implementations, users may be considered physically present at the same or similar location based on one or more of the users having detected one or more extraterrestrial bodies at a common time of day (or night), the users being present at a common physical location on Earth, the users having detected one or more extraterrestrial bodies with a common visibilities, and/or other considerations. During synchronous gameplay, users may interact with each other and/or the virtual environment in real time.

In some implementations, the virtual environment and/or game may be semi-synchronous between users who may not be physically present at the same or similar location. In some implementations, users may be considered not to be physically present at the same or similar location based on one or more of the users having detected one or more extraterrestrial bodies at different times of day (or night), the users being present at different physical locations on Earth, the users having detected one or more extraterrestrial bodies with varying visibilities, and/or other considerations. During semi-synchronous gameplay, users may not interact with each other in real time. Instead, a user may obtain game state information that reflects gameplay of another user who had participated at a point in time prior to the user. By way of non-limiting illustration, if gameplay involves interactions with a virtual object augmenting the appearance of the Moon (or other extraterrestrial body), only (approximately) half of the world may be able to observe the Moon (or other extraterrestrial body). Thus, users who are able to observe and detect an extraterrestrial body may engage in gameplay during a certain period of time where the extraterrestrial body may be observable and/or detectable. The gameplay may be updated through the generation and/or updating of game state information. At a later time, other users (who are perhaps on the other side of the world) who previously were not able to observe the extraterrestrial body but now are able to, may obtain the game state information that reflects the prior gameplay by the other users. These users may now proceed in gameplay that may be synchronized (albeit not in real time) with the prior gameplay of the other users.

In some implementations, gameplay may be of one or more gameplay types. A gameplay type may include one or more of cooperative gameplay, solo gameplay, combative gameplay, team-based gameplay, racing, resource collection, scavenger hunt, and/or other types of gameplay. In some implementations, the game taking place in the virtual environment may be in the form of a massively multiplayer online role-playing game (MMORPG).

In some implementations, game component 112 may utilize resource information to facilitate gameplay. The game component 112 may execute gameplay and/or gameplay events based on the resource information. By way of non-limiting illustration, gameplay and/or a gameplay event may be executed based on obtaining a first set of resource information for a first extraterrestrial body. In some implementations, gameplay and/or a first gameplay event may be executed responsive to obtaining one or more of first location information, first trajectory information, first phase information, and/or other information. In some implementations, individual gameplay and/or individual gameplay event may be specific to individual ones of (or combinations of) one or more of the location information, trajectory information, phase information, and/or other information.

By way of non-limiting illustration, game component 112 may execute a game for a user and/or group of users for a certain period of time based on trajectory information specifying that an extraterrestrial body may be observable by the user and/or group of users during that certain period of time. By way of non-limiting illustration, if the extraterrestrial body is the Moon, gameplay may be made available to a group of users who are able to observe the Moon from their physical location(s) on Earth.

In some implementations, a gameplay event may include events and/or interactions within a virtual environment that may or may not occur during normal course of play. By way of non-limiting illustration, a gameplay event may include one or more of a timed tournament, themed gameplay, and/or other considerations. Themed gameplay may refer to gameplay mechanics and/or gameplay aesthetics being related by a common theme. A theme may include one or more of color, season, holiday, a brand, movie, fictional or non-fictional character, and/or other theme. In some implementations, the theme may be specific to information specified within resource information. By way of non-limiting illustration, game component 112 may execute a gameplay event based on on phase information specifying that an extraterrestrial body having a specified visibility. By way of non-limiting illustration, if the extraterrestrial body is the Moon, a gameplay event may be executed during one or more of a full-moon phase of the Moon, a lunar eclipse, and/or other phase. In some implementations, if the extraterrestrial body is the Moon, and phase information specifies there is a full moon, then gameplay having a werewolf theme may be executed (e.g., the theme of werewolf corresponding to a full moon).

In some implementations, a gameplay event may include "collecting" meteorites during a meteor shower. By way of non-limiting illustration, virtual objects may be overlaid over views of the meteorites and gameplay may include making selection of the virtual objects as the meteorites become viewable. In some implementations, gameplay and/or a gameplay event may be executed during a rocket launch with the extraterrestrial body being the rocket. In some implementations, different gameplay events may be executed around the cycle of the moon. In some implementations, gameplay events may be executed when planets are visible.

In some implementations, input component 116 may be configured to obtain information defining user input. The user input may be related to performance of one or more game actions within the virtual environment. The game actions may include one or more of controlling a game entity, interacting with virtual objects and/or other users, and/or other types of actions. The control component 114 may be configured to control the presentation device 102 to effectuate the user input to perform the one or more game actions within the virtual environment. Effectuating the user input may cause user interactions with one or more of a virtual object augmenting an appearance of an extraterrestrial body, virtual objects associated with other users, and/or other content within the virtual environment.

The user input may comprise gesture-based input, physical interaction with one or more components of system 100, and/or other input. In some implementations, user input may be derived from one or more of sensor output of one or more sensors 124, interaction with display 122, and/or other sources.

The input component 116 may be configured to detect and/or recognize one or more real-world objects based on sensor output from one or more sensors 124. A real-world object may include, for example, a human hand and/or other user appendage. One or more real-world objects may be recognized based on one or more point clouds having points lying on one or more surface of the one or more real-world objects. By way of non-limiting illustration, a point cloud having a shape of a known real-world object (e.g., a human hand) may be recognized as the real-world object. Recognition of a real-world object may include identification of the presence of the real-world object.

In some implementations, input component 116 may be configured to identify gestures and/or actions being performed by a hand. A gesture and/or action may include one or more of reaching, grabbing, releasing, swiping, pinching, pulling, throwing, clicking, pointing, pushing, and/or other gestures and/or actions of real-world objects.

In some implementations, display 122 may comprise a touchscreen display on which a user may physically interact. A user may interact with display 122 to perform one or more game actions in a game. By way of non-limiting illustration, a user may interact with display 122 by one or more of touching, swiping, pinching, moving, and/or other interactions.

Figure 3:
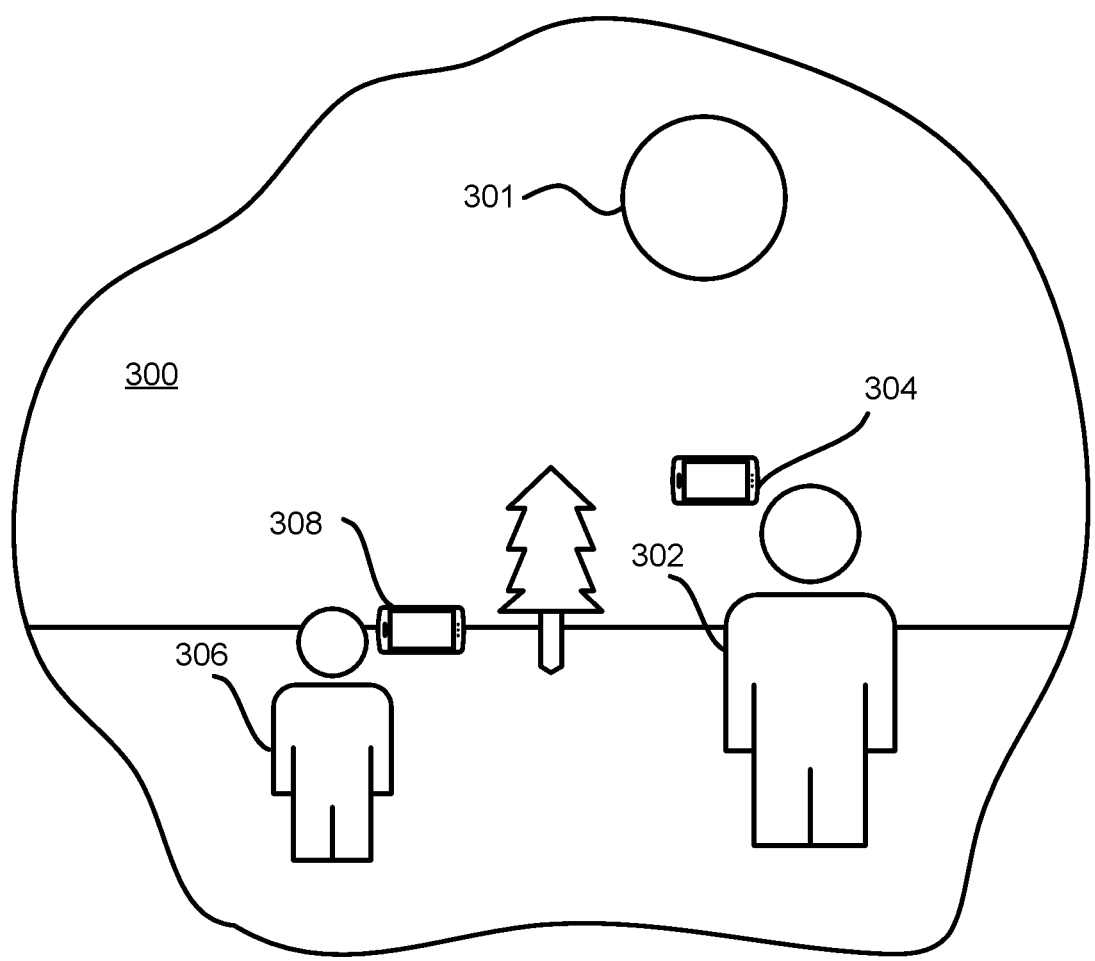
FIG. 3 shows a graphic illustration of an implementation of the system of FIG. 1.
Figure 4:
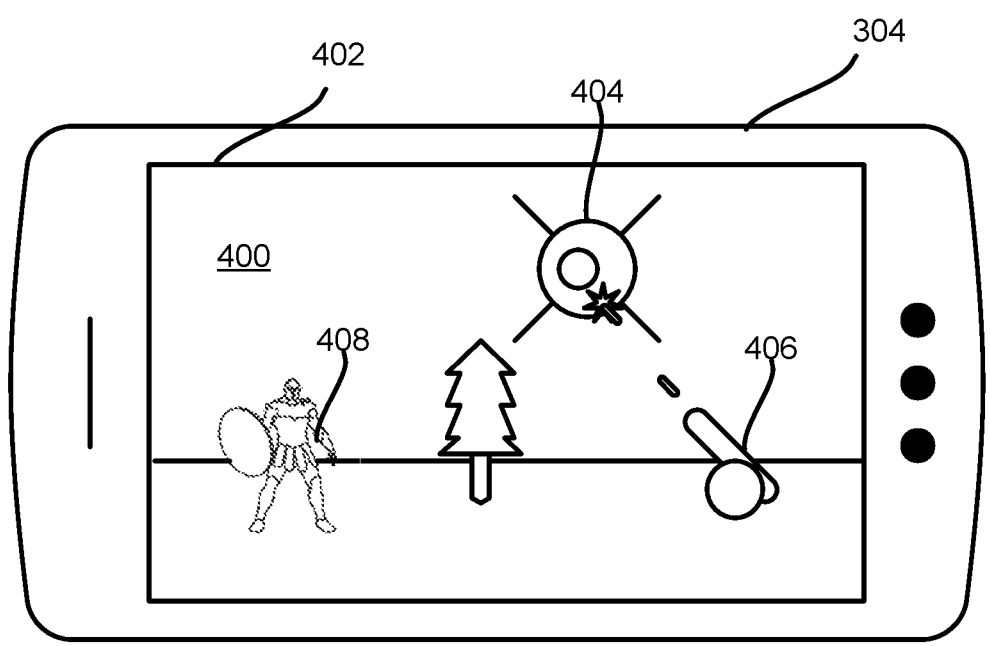
FIG. 4 shows a graphic illustration of an implementation of the system of FIG. 1.

FIGS. 3-4 depict graphic illustrations of an implementation of system 100 of FIG. 1. These depictions are provided for illustrative purposely only and are not to be considered limiting.

FIG. 3 shows an illustration of an implementation of the system of FIG. 1. In FIG. 1, a first user 302 and a second user 306 are shown as being present in a real-world environment 300. The first user 302 may be associated with, and use, a first presentation device 304. The second user 306 may be associated with, and use, a second presentation device 308. A extraterrestrial body 301 may be present in the real-world environment 300. The extraterrestrial body 301 may include, for example, the Moon. The first user 302 may point the first presentation device 304 (and/or an image sensor thereon) toward the extraterrestrial body 301. The first presentation device 304 may detect the extraterrestrial body 301. The first presentation device 304 may specify a location of the extraterrestrial body 301 as a reference point. The first presentation device 304 may generate an image of a virtual object and present the image to augment the appearance of the extraterrestrial body 301 (see, e.g., FIG. 4). The second user 306 may point the second presentation device 308 (and/or an image sensor thereon) toward the extraterrestrial body 301. The second presentation device 308 may detect the extraterrestrial body 301. The second presentation device 308 may specify a location of the extraterrestrial body 301 as a reference point. The second presentation device 308 may generate an image of a virtual object and present the image to augment the appearance of the extraterrestrial body 301. The first user 303 and the second user 306 may engage in gameplay via their respective presentation devices.

FIG. 4 shows a graphic illustration of an implementation of the system of FIG. 1. In particular, FIG. 4 shows a view of an interactive environment 400 presented on a display 402 of the first presentation device 304. The interactive environment 400 may include views of virtual objects superimposed over views of the real-world environment 300 (shown in FIG. 3). Here, the views of the real-world environment may be considered passive views because they are being presented on display 402 and not being viewed directly by the user, for example, through a visor. The interactive environment 400 may include one or more virtual objects. The one or more virtual objects may include one or more of a first virtual object 404, a second virtual object 406, a third virtual object 408, and/or other virtual objects. The first virtual object 404 may comprise an object configured to augment an appearance of the extraterrestrial body 301 (shown in FIG. 3). The first virtual object 404 may include, for example, a space ship. The second virtual object 406 may comprise a virtual item. The second virtual object 406 may an virtual item usable by the user of the first presentation device 406 to engage in gameplay. By way of non-limiting illustration, the second virtual object 406 may comprise a virtual weapon used to battle the first virtual object 404 that augments the appearance of the extraterrestrial body 301. The third virtual object 408 may comprise a game entity associated with and/or controlled by the second user (not shown in FIG. 4). As an example of gameplay, the second user may utilize the third virtual object 408 to cooperatively battle the first virtual object 404. As another example of gameplay, the second user may utilize the third virtual object 408 to combat the user of the first presentation device 304 and/or protect the first virtual object 404.

Returning to FIG. 1, external resource(s) 131 may include sources of information, hosts, and/or providers of information outside of system 100, external entities participating with system 100, and/or other resources. In some implementations, some or all of the functionality attributed herein to external resource(s) 131 may be provided by resources included in system 100. By way of non-limiting illustration, an external entity may include a server and/or database configured to provide one or more of virtual content information, resource information, and/or other information.

The presentation device 102 may include communication lines or ports to enable the exchange of information with one or more networks 130. The one or more networks 130 may include wired and/or wireless connections. By way of non-limiting illustration, one or more networks 130 may include one or more of the Internet, wireless Bluetooth Low Energy (BLE), wired Universal Serial Bus (USB) connection, and/or other connections. It will be appreciated that this is not intended to be limiting and that the scope of this disclosure includes implementations in which components of system 100 may be operatively linked via some other communication media.

Illustration of the presentation device 102 in FIG. 1 is not intended to be limiting. The presentation device 102 may include a plurality of hardware, software, and/or firmware components operating together to provide the functionality attributed herein to the presentation devices. For example, presentation device 102 may be implemented by a cloud of computing platforms operating together.

Electronic storage 120 of presentation device 102 may include electronic storage media that electronically stores information. The electronic storage media of electronic storage 120 may include one or both of system storage that is provided integrally (i.e., substantially non-removable) with presentation device 102 and/or removable storage that is removably connectable to presentation device 102 via, for example, a port or a drive. A port may include a USB port, a firewire port, and/or other port. A drive may include a disk drive and/or other drive. Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 120 may include one or more virtual storage resources (e.g., cloud storage, a virtual private network, and/or other virtual storage resources). Electronic storage 120 may store software algorithms, information determined by processor(s) 104, information received from external resource(s) 131, and/or other information that enables system 100 to function as described herein.

Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108-116. Processor(s) 104 may be configured to execute components 108-116 by software; hardware; firmware; some combination of software, hardware, and/or firmware; and/or other mechanisms for configuring processing capabilities on processor(s) 104.

It should be appreciated that although components 108-116 are illustrated in FIG. 1 as being co-located within a single processing unit, in implementations in which processor(s) 104 includes multiple processing units, one or more of components 108-116 may be located remotely from the other components. While computer program components are described herein as being implemented via processor(s) 104 through machine readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108-116 described above is for illustrative purposes and is not intended to be limiting, as any of components 108-116 may provide more or less functionality than is described. For example, one or more of components 108-116 may be eliminated, and some or all of its functionality may be provided by other ones of components 108-116 and/or other components. As another example, processor(s) 104 may be configured to execute one or more additional components that may perform some or all of the functionality attributed to one of components 108-116.

Figure 2:
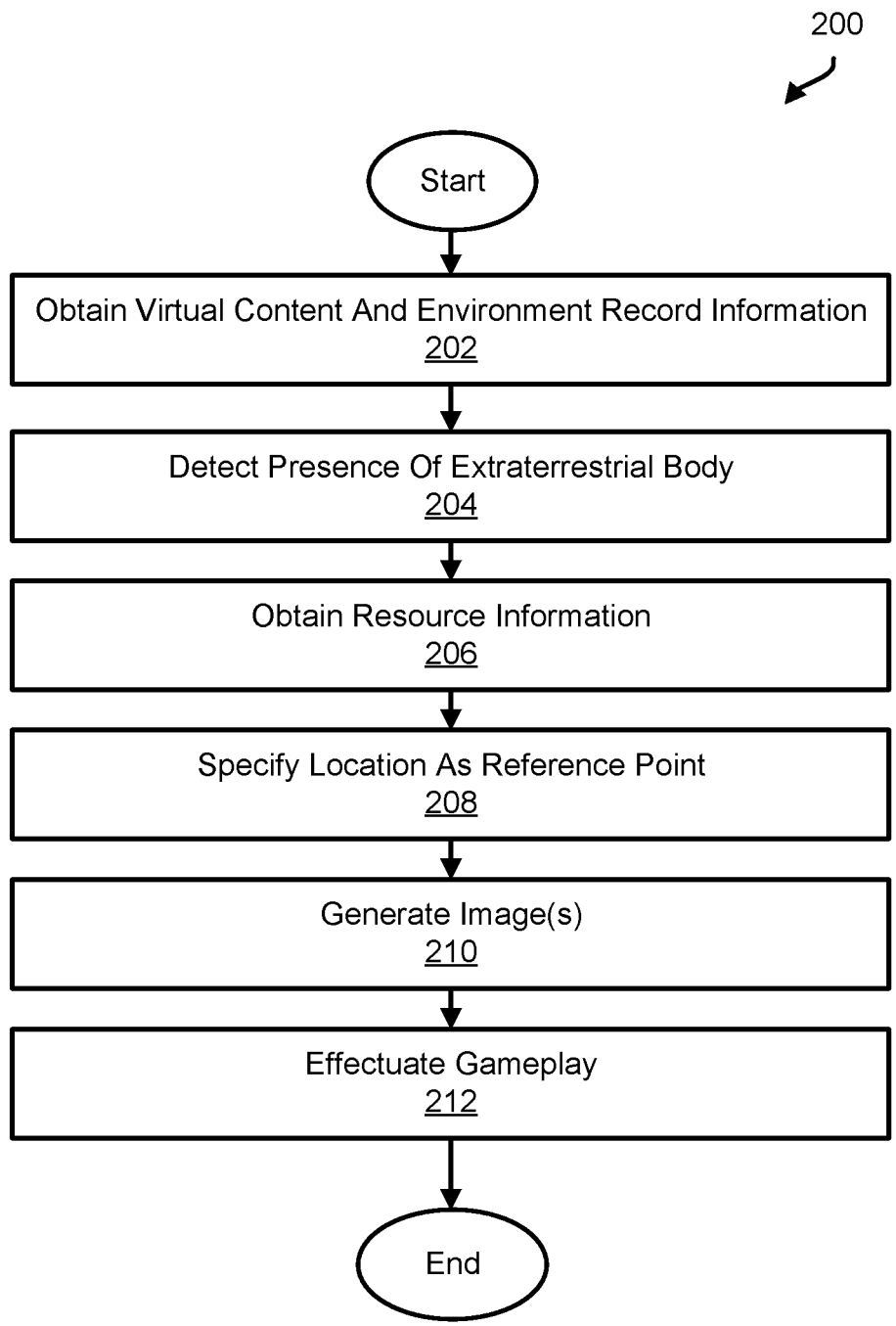
FIG. 2 illustrates a method to provide a shared interactive experience across multiple presentation devices, in accordance with one or more implementations.

FIG. 2 illustrates a method 200 to provide a shared augmented reality experience across multiple presentation devices, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200. By way of non-limiting illustration, method 200 may be implemented in a presentation device the same as or similar to presentation device 102 (shown in FIG. 1 and described herein).

At an operation 202, virtual content information, environment record information, and/or other information may be obtained. The environment record information may define a composition of a real-world environment. The composition of the real-world environment may include one or more reference points. The virtual content information may define a virtual environment including virtual content. The virtual content may include one or more virtual objects. The virtual environment may be specified with respect to the one or more reference points within the real-world environment. In some implementations, operation 202 may be performed by one or more physical processors executing a content component the same as or similar to content component 108 (shown in FIG. 1 and described herein).

At an operation 204, presence of one or more extraterrestrial bodies may be detected. In some implementations, operation 204 may be performed by one or more physical processors executing a detection component the same as or similar to detection component 110 (shown in FIG. 1 and described herein).

At an operation 206, resource information corresponding to a detected extraterrestrial body may be obtained. The resource information may specify information specific to the extraterrestrial body. The resource information may include a location of the extraterrestrial body and/or other information. In some implementations, operation 206 may be performed by one or more physical processors executing a content component the same as or similar to content component 108 (shown in FIG. 1 and described herein).

At an operation 208, the location of the extraterrestrial body may be specified as a first reference point within the real-world environment. The virtual environment may be specified with respect to the location of the extraterrestrial body. In some implementations, operation 208 may be performed by one or more physical processors executing a map component the same as or similar to map component 109 (shown in FIG. 1 and described herein).

At an operation 210, images of the virtual environment including the virtual content may be generated and presented such that the virtual environment including the virtual content may be perceived by a user as being located in the real-world environment. The images may include an image of a virtual object. The image may be generated so that the virtual object may be perceived as being present at the location of the extraterrestrial body such that the virtual object augments the appearance of the extraterrestrial body. In some implementations, operation 210 may be performed by one or more physical processors executing a control component the same as or similar to control component 114 (shown in FIG. 1 and described herein).

At an operation 212, gameplay may be effectuated within the virtual environment. The gameplay may include user interactions with the virtual object. In some implementations, operation 212 may be performed by one or more physical processors executing a control component and/or a game component the same as or similar to control component 114 and/or game component 112, respectively (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide a shared augmented reality experience across multiple presentation devices, the system comprising:

non-transitory electronic storage storing:

environment record information, the environment record information including an environment record defining a composition of a real-world environment, the composition of the real-world environment including one or more reference points; and virtual content information, the virtual content information defining a virtual environment including virtual content, the virtual content including one or more virtual objects, wherein the virtual environment is specified with respect to the one or more reference points within the real-world environment;

a presentation device, the presentation device comprising a transparent display through which a user actively views the real-world environment, the presentation device being configured to generate images of the virtual environment including the virtual content and present the images on the transparent display such that the virtual environment including the virtual content is visually perceived by the user as being located in the real-world environment being viewed through the transparent display; and one or more physical processors configured by machine-readable instructions to:

detect presence of an extraterrestrial body;

obtain resource information corresponding to the extraterrestrial body, the resource information specifying information specific to the extraterrestrial body, wherein the resource information specifies a location of the extraterrestrial body;

specify, within the environment record information, the location of the extraterrestrial body as a first reference point within the real-world environment so that the virtual environment is specified with respect to the location of the extraterrestrial body, wherein the first reference point is a common reference point included in other environment records accessed by other presentation devices of other users so that the virtual environment presented via the other presentation devices is also specified with respect to the location of the extraterrestrial body, the common reference point facilitating a shared experience by the user and the other users interacting with the virtual environment;

control the presentation device to generate and present an image of a virtual object on the transparent display, the image being presented so that the virtual object is visually perceived as being present at the location of the extraterrestrial body such that the virtual object augments an appearance of the extraterrestrial body being viewed through the transparent display; and control the presentation device to effectuate gameplay within the virtual environment being visually perceived by the user as being located in the real-world environment in the views of the real-world environment, wherein effectuating the gameplay within the virtual environment includes facilitating user interactions with the virtual object.

2. The system of claim 1, wherein the extraterrestrial body includes one or more of a moon, a star, a satellite, a space station, a comet, or an airplane.

3. The system of claim 1, wherein the one or more physical processors are further configured by the machine-readable instructions to:

obtain user input to perform one or more game actions within the virtual environment; and control the presentation device to effectuate the user input to perform the one or more game actions within the virtual environment, wherein effectuating the user input causes the user interactions with the virtual object.

4. The system of claim 1, wherein the one or more physical processors are further configured by the machine-readable instructions to:

obtain game state information, the game state information defining a part of the gameplay within the virtual environment effectuated by the other presentation devices associated with the other users, the part of the gameplay within the virtual environment effectuated by the other presentation devices associated with the other users including control of one or more other virtual objects; and control the presentation device to generate one or more images of the one or more other virtual objects so that the one or more other virtual objects are perceived as being present in the real-world environment.

5. The system of claim 1, wherein the resource information further includes one or more of:

trajectory information, the trajectory information specifying a path of movement of the extraterrestrial body; and phase information, the phase information specifying a visibility of the extraterrestrial body.

6. The system of claim 1, wherein the one or more physical processors are further configured by the machine-readable instructions to:

obtain output signals from one or more sensors of the presentation device, the output signals conveying location information, the location information specifying a location of the presentation device; and wherein the visibility of the extraterrestrial body is dependent on the location of the presentation device.

7. The system of claim 1, wherein the one or more physical processors are further configured by the machine-readable instructions to:

obtain output signals from one or more sensors of the presentation device, the output signals conveying image information, the image information defining images of the real-world environment; and wherein the detection of the presence of the extraterrestrial body is performed based on the image information.

8. The system of claim 1, wherein the one or more physical processors are further configured by the machine-readable instructions to:

obtain output signals from one or more sensors of the presentation device, the output signals conveying orientation information, the orientation information orientation of the presentation device; and wherein the detection of the presence of the extraterrestrial body is performed based on the orientation information.

9. The system of claim 1, wherein the presentation device is a mobile computing platform.

10. The system of claim 1, wherein the presentation device is headset configured to be installed on a head of the user.

11. The system of claim 1, wherein the other presentation devices include a second presentation device, the second presentation device being configured to specify, in a second environment record, the location of the extraterrestrial body as the first reference point within the real-world environment so that the virtual environment for the second presentation device is also specified with respect to the location of the extraterrestrial body in common with the virtual environment for the presentation device.

12. A method to provide a shared augmented reality experience across multiple presentation devices, the method being implemented in a presentation device including one or more physical processors and a transparent display through which a user actively views a real-world environment, the method comprising:
obtaining:
environment record information, the environment record information including an environment record defining a composition of the real-world environment, the composition of the real-world environment including one or more reference points; and
virtual content information, the virtual content information defining a virtual environment including virtual content, the virtual content including one or more virtual objects, wherein the virtual environment is specified with respect to the one or more reference points within the real-world environment;
detecting presence of an extraterrestrial body;
obtaining resource information corresponding to the extraterrestrial body, the resource information specifying information specific to the extraterrestrial body, wherein the resource information specifies a location of the extraterrestrial body;
specifying, within the environment record information, the location of the extraterrestrial body as a first reference point within the real-world environment so that the virtual environment is specified with respect to the location of the extraterrestrial body, wherein the first reference point is a common reference point included in other environment records accessed by other presentation devices of other users so that the virtual environment presented via the other presentation devices is also specified with respect to the location of the extraterrestrial body, the common reference point facilitating a shared experience by the user and the other users interacting with the virtual environment;
generating images of the virtual environment including the virtual content and presenting the images on the transparent display such that the virtual environment including the virtual content is visually perceived by the user as being located in the real-world environment being viewed through the transparent display, the images including an image of a virtual object, the image being presented so that the virtual object is visually perceived as being present at the location of the extraterrestrial body such that the virtual object augments an appearance of the extraterrestrial body being viewed through the transparent display; and
effectuating gameplay within the virtual environment being visually perceived by the user as being located in the real-world environment in the views of the real-world environment, wherein effectuating the gameplay within the virtual environment includes facilitating user interactions with the virtual object.

13. The method of claim 12, wherein the extraterrestrial body includes one or more of a moon, a star, a satellite, a space station, a comet, or an airplane.

14. The method of claim 12, further comprising:
obtaining user input to perform one or more game actions within the virtual environment; and
effectuating the user input to perform the one or more game actions within the virtual environment, wherein effectuating the user input causes the user interactions with the virtual object.

15. The method of claim 12, further comprising:
obtaining game state information, the game state information defining a part of the gameplay within the virtual environment effectuated by the other presentation devices associated with the other users, the part of the gameplay within the virtual environment effectuated by the other presentation devices associated with the other users including control of one or more other virtual objects; and
generate one or more images of the one or more other virtual objects so that the one or more other virtual objects are perceived as being present in the real-world environment.

16. The method of claim 12, wherein the resource information further includes one or more of:
trajectory information, the trajectory information specifying a path of movement of the extraterrestrial body; and
phase information, the phase information specifying a visibility of the extraterrestrial body.

17. The method of claim 12, further comprising:
obtaining output signals from one or more sensors of the presentation device, the output signals conveying location information, the location information specifying a location of the presentation device; and
wherein the visibility of the extraterrestrial body is dependent on the location of the presentation device.

18. The method of claim 12, further comprising:
obtaining output signals from one or more sensors of the presentation device, the output signals conveying image information, the image information defining images of the real-world environment; and
wherein the detection of the presence of the extraterrestrial body is performed based on the image information.

19. The method of claim 12, further comprising:
obtaining output signals from one or more sensors of the presentation device, the output signals conveying orientation information, the orientation information orientation of the presentation device; and
wherein the detection of the presence of the extraterrestrial body is performed based on the orientation information.

20. The method of claim 12, wherein the presentation device is a mobile computing platform.

21. The method of claim 12, wherein the presentation device is headset configured to be installed on a head of the user.

22. The method of claim 12, wherein the other presentation devices include a second presentation device, and the method further comprises:

specifying, for the second presentation device in a second environment record, the location of the extraterrestrial body as the first reference point within the real-world environment so that the virtual environment for the second presentation device is also specified with respect to the location of the extraterrestrial body in common with the virtual environment for the presentation device.

\* \* \* \* \*